United States Patent

Evans et al.

[15] 3,644,130
[45] Feb. 22, 1972

[54] POWDERED WAX SUITABLE FOR EMULSIONS AND RUBBER BLENDING

[72] Inventors: Robert R. Evans, Fullerton; Peter S. Backlund, Anaheim, both of Calif.

[73] Assignee: Union Oil Company of California, Los Angeles, Calif.

[22] Filed: Jan. 23, 1967

[21] Appl. No.: 610,821

[52] U.S. Cl. ........................106/270, 106/271, 252/311.5, 260/28.5 B
[51] Int. Cl. ...........................................C08h 9/08
[58] Field of Search ..................106/270, 271, 272; 239/102; 208/20, 24, 26; 252/384, 383; 214/10.5

[56] References Cited

UNITED STATES PATENTS 3,152,917  10/1964  McCoy ..................................106/271
3,266,924  8/1966   Haeske ..................................106/272

OTHER PUBLICATIONS

Warth " Chemistry and Technology of Waxes" 1956, Reinhold Pub. Co., pages 487, 488.

Primary Examiner—Morris Liebman
Assistant Examiner—P. R. Michl
Attorney—Milton W. Lee, Richard C. Hartman, Lannas S. Henderson and Robert E. Strauss

[57] ABSTRACT

Wax powder which is resistant to congealing is prepared by blending molten wax and an antiblocking agent, dispersing the blend, and then cooling the dispersed blend below its melting point to form the powder.

2 Claims, No Drawings

POWDERED WAX SUITABLE FOR EMULSIONS AND RUBBER BLENDING

This invention relates to a process for dispersing waxes and more specifically to a process for producing waxes and wax emulsions suitable for use in rubber blends and to the composition of the rubber blends with these waxes.

Wax emulsions such as paraffin wax find use in oil well producing operations, as paperboard coating and for imparting a waterproof coating to hard board such as Masonite. Wax emulsions are also used as antioxidents for rubber and also are incorporated into rubber latices as a mold release agent and flame retardant for rubber and foam rubber moldings. However, there are several drawbacks when using present wax emulsions, particularly in rubber and foam rubber. If the wax emulsion is shipped, rather than being formulated at the point of use, an unnecessary transportation expense is incurred because the emulsion contains about 50 percent water. Obviously it would be better to ship the wax in a dry condition and add the water at the point of use; however, the powdered wax used in wax emulsions tends to congeal in storage or even when bulk shipped as a powder.

Another drawback of present wax emulsions having a high (about 60 percent) solids content is their lack of long term stability. This prevents both the user and manufacturer from maintaining a suitable stockpile on hand. Another drawback of present wax emulsions is the adverse effect some of the wax emulsifiers (e.g., the spans and tweens) have on the rubber foaming process.

With these drawbacks in mind it is an object of the invention to provide a powdered paraffin wax which resists congealing.

Another object is to provide a new and improved powdered paraffin wax blend with rubber or foam rubber.

Another object is to provide a stable dispersion of powdered wax in water.

Another object is to provide a new and improved process for powdering waxes.

Other objects will be disclosed from the description to follow.

The objects of the invention are achieved by incorporating an antiblocking agent into the wax prior to or during the powdering process. While not essential to the powdering process, the antiblocking agent prevents the wax particles from congealing into larger scale agglomerates while they are being formed. During storing or transportation, the natural tendency of the powdered wax to congeal is also prevented by the action of the antiblocking agent. Furthermore, the wax particles do not undergo a deleterious increase in particle size and consequently may be incorporated directly into the rubber latex or into a water emulsion suitable for addition to a rubber latex.

The water emulsion of these powdered waxes may also be employed for coating articles, waterproofing, oil well producing operations, etc. The emulsions have long term storage stability even at concentrations of 60 percent.

The waxes contemplated by this invention vary in means molecular weight from about 550 to 1,000. The waxes at the lower end of the molecular weight range are linear paraffins which occur naturally in crude oil and which have been separated therefrom. One particularly preferred type of wax containing about 45 carbon atoms per molecule and known as Aristowax 143/150 is sold by the Union Oil Company of California. The waxes at the upper end of the molecular weight range are of the microcrystalline type. One such type of wax is sold by the Sunray DX Oil Company, Tulsa, Okla. under the trade name of Sunray DX m160s.

The antiblocking agents which may be employed in this invention are commonly employed with high molecular weight polymers such as polyethylene, polypropylene, etc. These antiblocking agents include N, N'-ethylene bis-stearamide (sold by the Carlisle Chemical Company as Carlisle Wax 280), methylene bis-stearamide, polyethylene glycol (about 4,000 molecular weight), micronized silica, carnauba wax, sugar cane wax and glokem wax (long chain fatty amide and esters).

Slip agents having antiblocking properties may also be employed as an additive provided that they impart an antiblocking effect to the wax. Since slip and antiblocking are closely related properties, it is preferable to employ a compound which is both a slip agent and an antiblocking agent. N, N'ethylene bis-stearamide will perform this dual function when employed with Aristowax 143/150.

The concentration of antiblocking agent which is employed will vary, depending on the type of wax employed and on the properties of the antiblocking agent, but is generally less than 0.5 percent. About 0.2 percent of N, N'-ethylene bis-stearamide, in Aristowax is effective.

EXAMPLE 1

Production of Powdered Wax

A quantity of Aristowax 143/150 was mixed with 0.2 percent N, N'-ethylene bis-stearamide (Carlisle Wax 280) and heated to 308° F. to melt the blend. This melting temperature is sufficiently in excess (about 50° F.) of the Aristowax melting point to ensure a nonviscous flow. The molten mixture was pressured with air and steam at 300° F. and then ejected at 1.8 pounds per minute from an ultrasonic nozzle at a pressure of 84 p.s.i. (Nitrogen, carbon dioxide or any other inert gases may be also employed in place of or in conjunction with air and steam.) This dispersed the molten wax into the air as a powder which immediately cooled to below the melting temperature without congealing to form particles having a size of about 0.5 to 20 microns. The ultrasonic nozzle employed was manufactured by Astronics, Inc., Syosset, N.Y. under the trade name of "Series 4000 Astrospray Nozzle." Nozzles of this type are described in U.S. Pat. Nos. 2,519,619; 3,081,946; and 3,070,313.

EXAMPLE 2

Production of Wax Emulsions

The powdered Aristowax 143/150 produced in Example 1 and containing the Carlisle Wax 280 antiblocking agent was shipped to the point of use and was dispersed in water; the emulsifiers employed were typical of those used in rubber latices, namely Aerosol OT–75 and Triton X–165. The dispersion contained the following ingredients:

Water: 97.25 parts; Powdered Wax (including antiblocking agent) 1.5 parts; Aerosol OT–75: 1.8 parts and Triton X–165: 0.95 parts. This composition is suitable for addition to a rubber latex.

Emulsifiers (including those above) which may be employed are as follows:

| Trade Name | Chemical Composition | Manufacturer |
|---|---|---|
| Aerosol OT–75 | Dioctyl sodium sulfoccinate | American Cyanamid Co. |
| Triton X–165 | Alkylphenoxy poly-ethyoxy ethanols | Rohm & Haas Co. |
| Tergitol NPX | Alkylphenoxy poly- ethanols | Union Carbide |
| Tergitol NP33 | ethoxy ethanols | Chemicals |
| Emcol 230–76 | Sodium bis(tridecyl) Sulfosuccinate | Witco Chemical Co. |
| Emcol T–60 | Alkylphenoxy poly-ethoxy ethanols | Witco Chemical Co. |

In general, mixtures of nonionic (alkylphenoxy polyethoxy ethanols) and anionic (sodium sulfosuccinate types) surfactants may be used as emulsifiers.

EXAMPLE 3

Production of Emulsions Containing a High Wax Content: these are produced using the following formulation:

| Composition A (50% solids) | Composition B (60% solids) |
|---|---|

| | |
|---|---|
| 100 parts powdered wax of example 1 | 120 parts powdered wax of example 1 |
| 100 parts water | 80 parts water |
| 0.4 parts Igepal CO 970 | 0.4 parts Igepal CO 970 |
| 0.4 parts Emcol L30–76 | 0.4 parts Emcol L30–76 |

Igepal CO 970 is a surfactant of the nonylphenoxy polyoxyethylene ethanol type, and is sold by the General Dyestuff Corp. Emcol L30–76 is a surfactant of the sodium bis(tridecyl) sulfosuccinate type. Other surfactants which may be employed are mixtures of nonionic and anionic types.

Compositions A and B were stable for about 8 hours and could be stabilized for several days by the addition of 0.2 and 0.1 part respectively of Dow Pusher, a composition of the polyacrylamide type (>200,000 molecular weight). Equivalent long term stabilized emulsions can be obtained by employing stabilizers such as hydroxymethyl cellulose and hydroxyethyl cellulose. These compounds are commercially available and can be obtained with wide variations in molecular weight, viscosity and acetyl number, which permits a wide degree of end use. Polymethacrylamide may also be employed to impart long term stability to the emulsions of powdered wax and water.

The emulsions and stabilizers can be incorporated into the wax at the powdering stage and this permits an emulsification simply be adding the wax to the water and stirring.

EXAMPLE 4

Production of Rubber-Wax Emulsions

The following waxes were incorporated into a rubber latex prior to foaming to impart flame retardant properties to the foam rubber.

The foam rubber produced from Compounds 1 and 2 above were equivalent in flame retardant properties to that produced using the wax additive, Mobil Ser A, a wax sold by Socony Mobil Oil Company.

Many other rubber latices are available such as: butadiene-acrylonitrile, natural rubber, polyisoprene rubber, stereoregular polybutadiene, and other synthetic rubber latices.

It will be observed that Compound 2 of Example 4 is virtually 100 percent wax, and this is cheaper and more convenient from the standpoint of shipping, since water is not a weight factor. In addition, the pure or emulsified powdered wax containing the antiblocking agent can be stored for about 6 months without the occurrence of deleterious agglomeration; this permits a suitable inventory to be maintained both at the site of manufacturing and the site of use. Normally, the storage life of prior art wax emulsions is about one week.

We claim:

1. A process for powdering wax which comprises ejecting a nonviscous solution of an antiblocking agent and a wax selected from the group consisting of paraffin wax and microcrystalline wax through an ultrasonic nozzle under fluid pressure and cooling the resultant powder below its melting point.

2. The process of claim 1 in which the concentration of antiblocking agent is sufficiently high to prevent congealing of the wax powder. 1 in which the concentration of antiblocking agent is sufficiently high to prevent congealin g of the wax powder.

| Compound | Wax composition | Particle size | Rubber latex type | Concentration of wax in rubber latex |
|---|---|---|---|---|
| 1 | 58% emulsion of a 140° F. melting point de-oiled paraffin wax. | 1μ | Styrene-butadiene synthetic rubber latex. | 2 parts wax emulsion; 98 parts rubber latex containing equal parts of: A: 97.25% water, 1.80% aerosol OT-75, 0.95% Triton X-165, and B: rubber latex. |
| 2 | 99.8% powdered, de-oiled paraffin wax, 140° F. melting point and powdered by method of claim 1 with 0.2% anti-blocking agent (Carlisle wax 280). | 1μ | Styrene-butadiene synthetic rubber latex. | 2% powdered wax (with anti-blocking agent); 98% rubber latex containing equal parts of: A: 97.25% water, 1.80% aerosol OT-75, 0.95% Triton X-165, and B: rubber latex. |

UNITED STATES PATENT OFFICE
CERTIFICATE OF CORRECTION

Patent No. 3,644,130          Dated February 22, 1972

Inventor(s) Robert R. Evans and Peter S. Backlund

It is certified that error appears in the above-identified patent and that said Letters Patent are hereby corrected as shown below:

Claim 2 should read as follows:

2. The process of claim 1 in which the concentration of antiblocking agent is sufficiently high to prevent congealing of the wax powder.

Signed and sealed this 18th day of July 1972.

(SEAL)
Attest:

EDWARD M. FLETCHER, JR.          ROBERT GOTTSCHALK
Attesting Officer                Commissioner of Patents